United States Patent
Hoye et al.

(10) Patent No.: US 9,996,756 B2
(45) Date of Patent: Jun. 12, 2018

(54) DETECTING RISKY DRIVING WITH MACHINE VISION

(71) Applicant: Lytx, Inc., San Diego, CA (US)

(72) Inventors: Brett Hoye, San Marcos, CA (US); Gabriela Surpi, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 189 days.

(21) Appl. No.: 14/841,376

(22) Filed: Aug. 31, 2015

(65) Prior Publication Data

US 2017/0061222 A1    Mar. 2, 2017

(51) Int. Cl.
   *G06K 9/00*   (2006.01)
   *G07C 5/06*   (2006.01)
   *G07C 5/00*   (2006.01)

(52) U.S. Cl.
   CPC ..... *G06K 9/00845* (2013.01); *G06K 9/00791* (2013.01); *G07C 5/008* (2013.01); *G07C 5/06* (2013.01)

(58) Field of Classification Search
   None
   See application file for complete search history.

(56) References Cited

U.S. PATENT DOCUMENTS

| | | | | |
|---|---|---|---|---|
| 2009/0284361 | A1* | 11/2009 | Boddie | B60Q 9/008 340/439 |
| 2012/0100509 | A1* | 4/2012 | Gunderson | G07C 5/0891 434/62 |
| 2013/0226408 | A1* | 8/2013 | Fung | B60W 40/09 701/41 |
| 2014/0372017 | A1* | 12/2014 | Armitage | B60W 40/09 701/117 |
| 2015/0054934 | A1* | 2/2015 | Haley | G06K 9/00845 348/78 |
| 2016/0046298 | A1* | 2/2016 | DeRuyck | B60W 40/09 340/576 |
| 2016/0267335 | A1* | 9/2016 | Hampiholi | G06F 3/013 |

* cited by examiner

*Primary Examiner* — Sean Conner
(74) *Attorney, Agent, or Firm* — Van Pelt, Yi & James LLP

(57) ABSTRACT

A system for driver risk determination using machine vision includes an interface and one or more processors. The interface is to receive one or more video data streams. The one or more processors is/are to determine, whether a driving behavior risk type appears in one of the one or more video data streams; and in the event that the driving behavior risk type appears in the one of the one or more video data streams, indicate the driver behavior risk type.

35 Claims, 9 Drawing Sheets

Interior Camera

Exterior Camera

DETECTING RISKY DRIVING WITH MACHINE VISION

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. Anomalous event types include accident anomalous events, maneuver anomalous events, location anomalous events, proximity anomalous events, vehicle malfunction anomalous events, driver behavior anomalous events, or any other anomalous event types. Some anomalous events cannot be detected by vehicle sensors, but need to be identified in real time.

BRIEF DESCRIPTION OF THE DRAWINGS

Various embodiments of the invention are disclosed in the following detailed description and the accompanying drawings.

DETAILED DESCRIPTION

Figure 1:
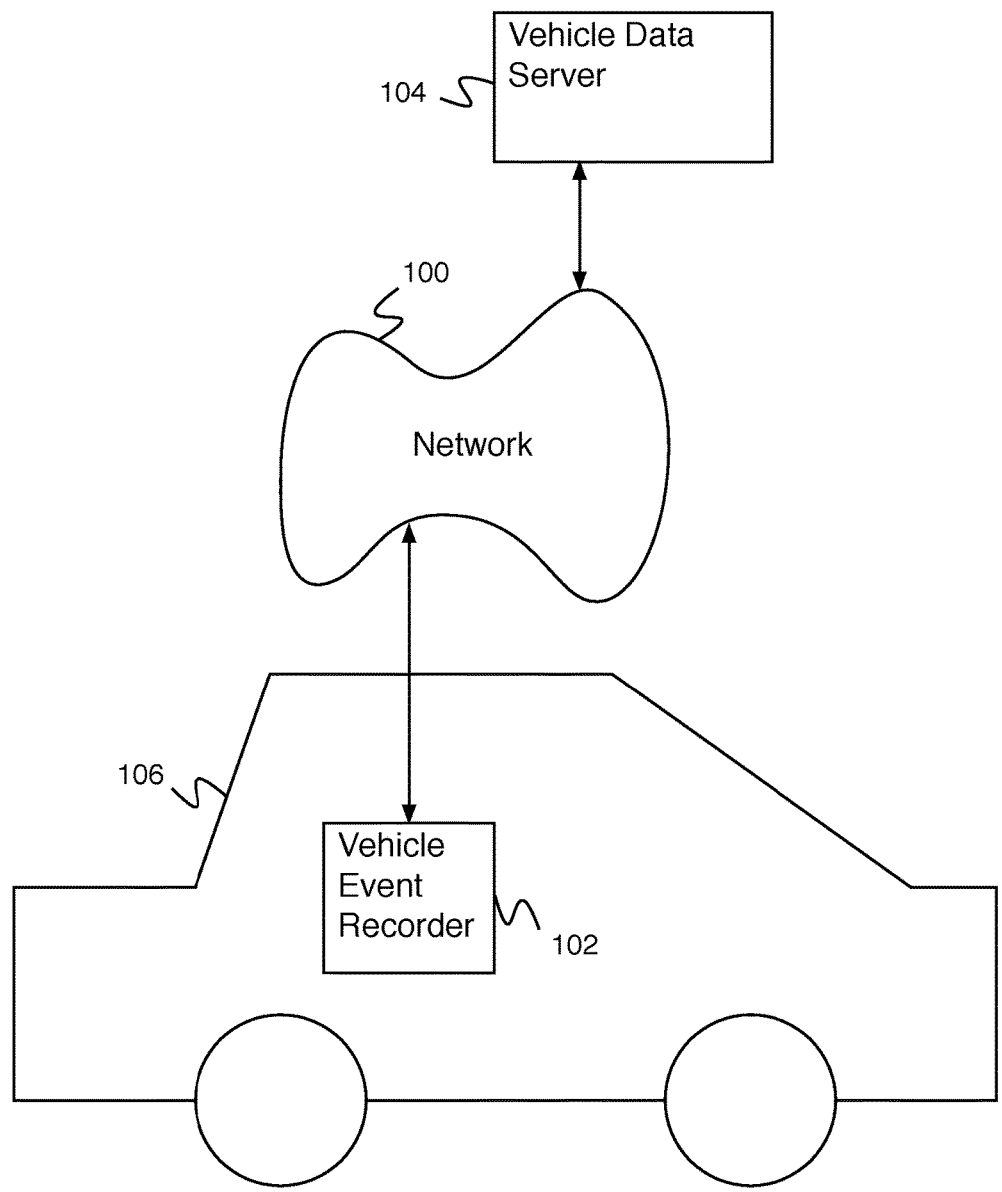
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for driver risk determination using machine vision is disclosed. In some embodiments, the system for driver risk determination comprises an interface to receive one or more video data streams; and a processor to determine, using machine vision, whether a driving behavior risk type appears in one of the one or more video data streams, and in the event that a driving behavior risk type appears in the one of the one or more video data streams, indicate the driver behavior risk type. In some embodiments, the system for driver risk determination additionally comprises a memory coupled to the processor and configured to provide the processor with instructions.

In some embodiments, a system for driver risk determination using machine vision comprises one or more video data streams. In various embodiments, the one or more video data streams comprise one or more of the following: a video data stream from an interior camera, a video data stream from an exterior camera, a video data stream from a vehicle video camera, a video data stream from an interior camera and a video data stream from an exterior camera, or any other appropriate video data streams. The system for driver risk determination collects video data from the one or more video data streams during a ride. In some embodiments, video is collected at a predetermined rate (e.g., five seconds of thirty frames per second video per minute, one frame of video per second continuously, thirty frames of video per second continuously, etc.). The system for driver risk determination determines whether a driving behavior risk type appears in one of the video data streams. In some embodiments, a system for driver risk determination determines whether a driving behavior risk type appears in one of the video data streams using machine vision (e.g., automated computer algorithms for recognizing characteristic events or objects in video). In various embodiments, driver risk types determined from a video data stream from an interior camera comprise a gaze direction risk type (e.g., an incident of driver behavior risk determination based at least in part on the driver gaze direction, e.g., whether the driver is looking at the road), a head orientation risk type (e.g., an incident of driver behavior risk determination based at least in part on the driver head orientation, e.g., whether the driver is looking through the window), a body position risk type (e.g., an incident of driver behavior risk determination based at least in part on the driver body position, e.g., whether the driver is in the typical position for driving), a hand position risk type (e.g., an incident of driver behavior risk determination based at least in part on the driver hand position—for example, whether the driver's hands are on the wheel, holding a phone, holding food, etc.), an eyelid position risk type (e.g., an incident of driver behavior risk determination based at least in part on the driver's eyelid position—for example, whether the driver's eyes are open), or any other appropriate risk type. In various embodiments, driver risk types determined from a video data stream from an exterior camera comprise a lane drift risk type (e.g., an incident of driver behavior risk determination based at least in part on a vehicle lane drift, e.g. whether the driver is unintentionally drifting within the lane), a lane choice risk type (e.g., an incident of driver behavior risk determination based at least in part on the vehicle lane—for example, whether the driver is in the incorrect lane—a truck not driving in a right lane or a next to right lane), a turn indicator risk type (e.g., an incident of driver behavior risk determination based at least in part on the vehicle turn indicator—for example, whether the driver is shifting lanes without indicating), a relative speed risk type (e.g., an incident of driver behavior risk determination based at least in part on the vehicle relative speed—for example, whether the driver is driving at an inappropriate speed for the traffic on the road), a frequent lane change indicator type (e.g. an incident of driver behavior risk determination based at least in part on the number of lane changes performed during a short period of time—for example the driver is too aggressive trying to go faster than traffic and frequently changes lanes) or any other appropriate risk type. In some embodiments, in the event a driver behavior risk type is determined, an incident severity of driver behavior risk is determined based at least in part on the driver behavior risk type. In some embodiments, all incidences of driver risk are stored as metadata, metadata is transmitted, driver risk is determined, and risk response action (e.g., a determination of a coachable event) is taken. In various embodiments, metadata for the incidences of driver risk comprise a timestamp, a risk type, an incident description (e.g., different sensor measurements relevant to the incident dependent on risk type), or any other appropriate metadata.

In some embodiments, an incident description associated with a risk type determined at least in part to on gaze direction includes a period of time in which the driver was not looking at the road measured in seconds, the average location in the image frame at which he was looking, the road type, the average vehicle speed, the average following distance and the total number of lane departure warnings issued during that period. In some embodiments, an incident description associated with a risk type determined at least in part on lane change frequency (e.g., at least 3 lane changes are observed in the last 2 minutes) includes a number of lane changes performed during a time period (e.g., the last 2 minutes), the number of signaled lane changes, the road class, the number of road lanes, the average number of other surrounding vehicles detected, the average vehicle speed, the average following distance to a vehicle in the front, the number of lane departure warnings, the average relative speed to each surrounding vehicle detected during the time period (e.g., 2 minutes period). In some embodiments, the number of vehicles is limited (e.g., up to 10 vehicles) for which relative speed is determined. In some embodiments, an incident severity of driver behavior risk comprises a driver behavior risk level (e.g., a risk level indicating how risky the driver is, a risk level indicating how risky the incident of the driver behavior risk type is, etc.). In some embodiments, in the event the driver behavior risk level is above a driver behavior risk level threshold for metadata (e.g., for gaze direction risk type, a threshold of a period of time (e.g., 2 seconds) for the period of time the driver has his eyes off the road while driving faster than 10 kilometers per hour; for frequent lane changes risk type, a threshold of a number of lane changes within a period of time (e.g., 3 lane changes within 2 minutes), metadata is stored and transmitted (e.g., from an event recorder to a backend analysis server). In various embodiments, in the event the driver behavior risk level is above a driver risk level threshold for video, video data from one or more of the one or more video data streams is stored, video data from one or more of the one or more video data streams is transmitted, past and future driver risk is determined, a coachable event is indicated (e.g., in the event that a future driver risk is above a threshold of risk, then it is indicated to coach a driver using video or other data of risky events), or any other appropriate risk response action is taken.

FIG. 1 is a block diagram illustrating an embodiment of a system including a vehicle event recorder. In the example shown, vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, proximity sensors, a global positioning system (e.g., GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In some embodiments, vehicle event recorder 102 comprises a system for detecting vehicle proximity events. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder 102 data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for managing a camera.

Figure 2:
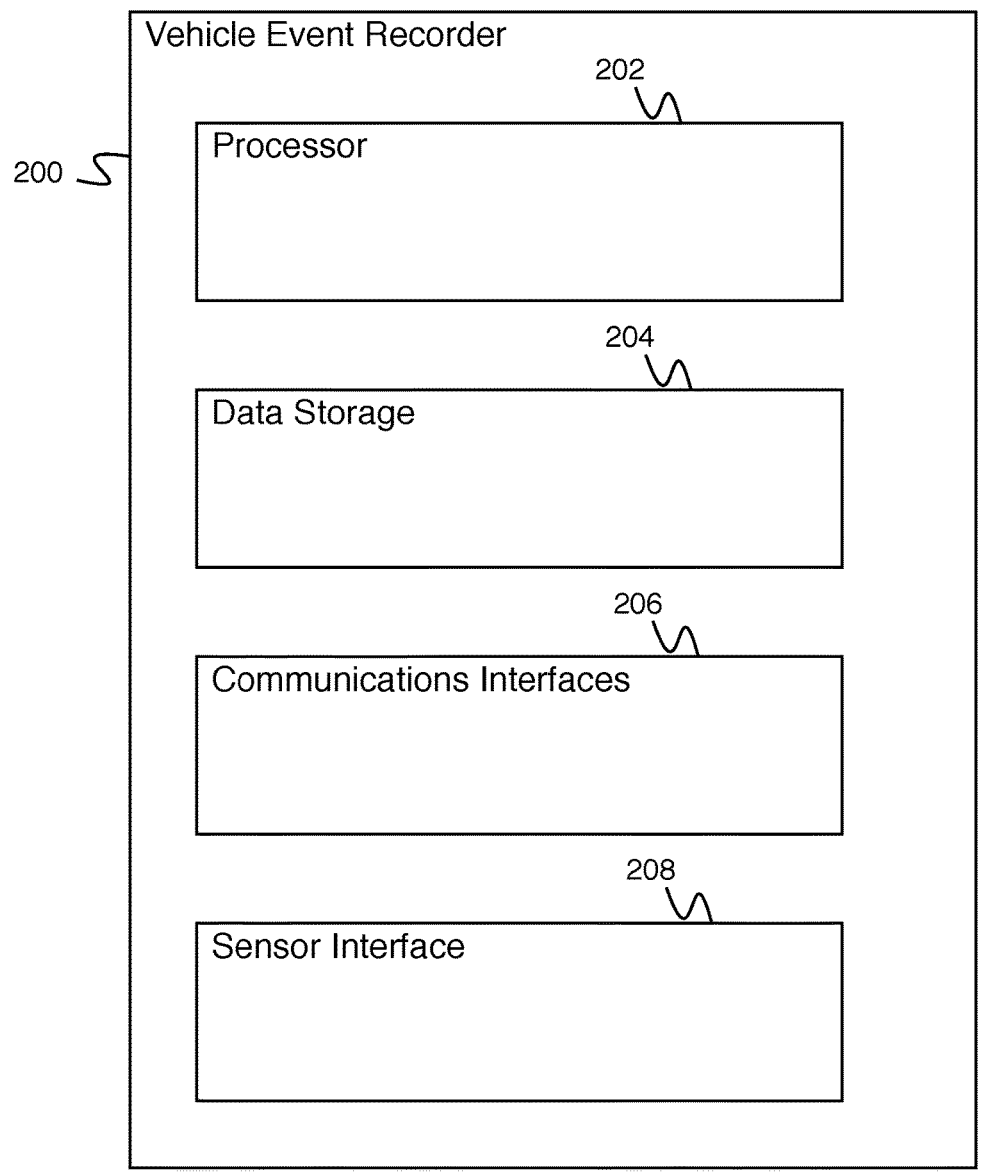
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus.

Figure 3:
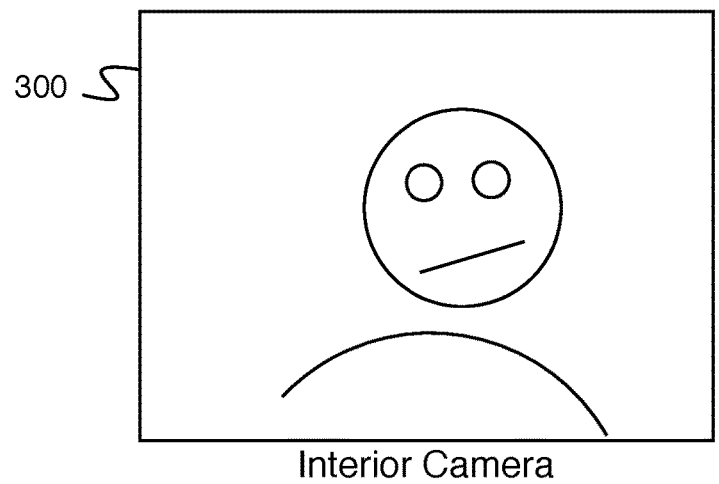
FIG. 3 is a diagram illustrating an embodiment of video data streams.
Figure 3:
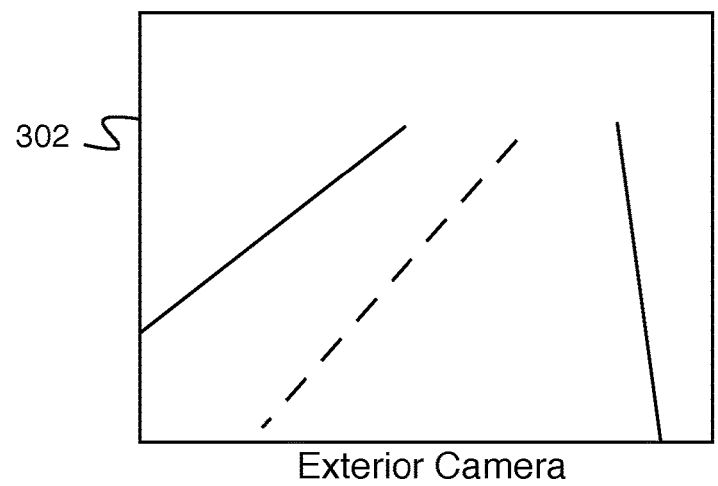

FIG. 3 is a diagram illustrating an embodiment of video data streams. In the example shown, image 300 comprises an image from a video data stream from an interior camera. In some embodiments, the video data stream from the interior camera is processed using machine vision. In various embodiments, the video data stream from the interior camera is processed to determine hand positions, hand actions, a body position, a gaze direction, a head orientation, an eyelid position, or any other appropriate interior camera data. In the example shown, image 302 comprises an image from an exterior camera. In some embodiments, the video data stream from the exterior camera is processed using machine vision. In various embodiments, the video data stream from the exterior camera is processed to determine a lane drift, a lane choice, a lane change, a traffic speed, or any other appropriate exterior camera data.

Figure 4:
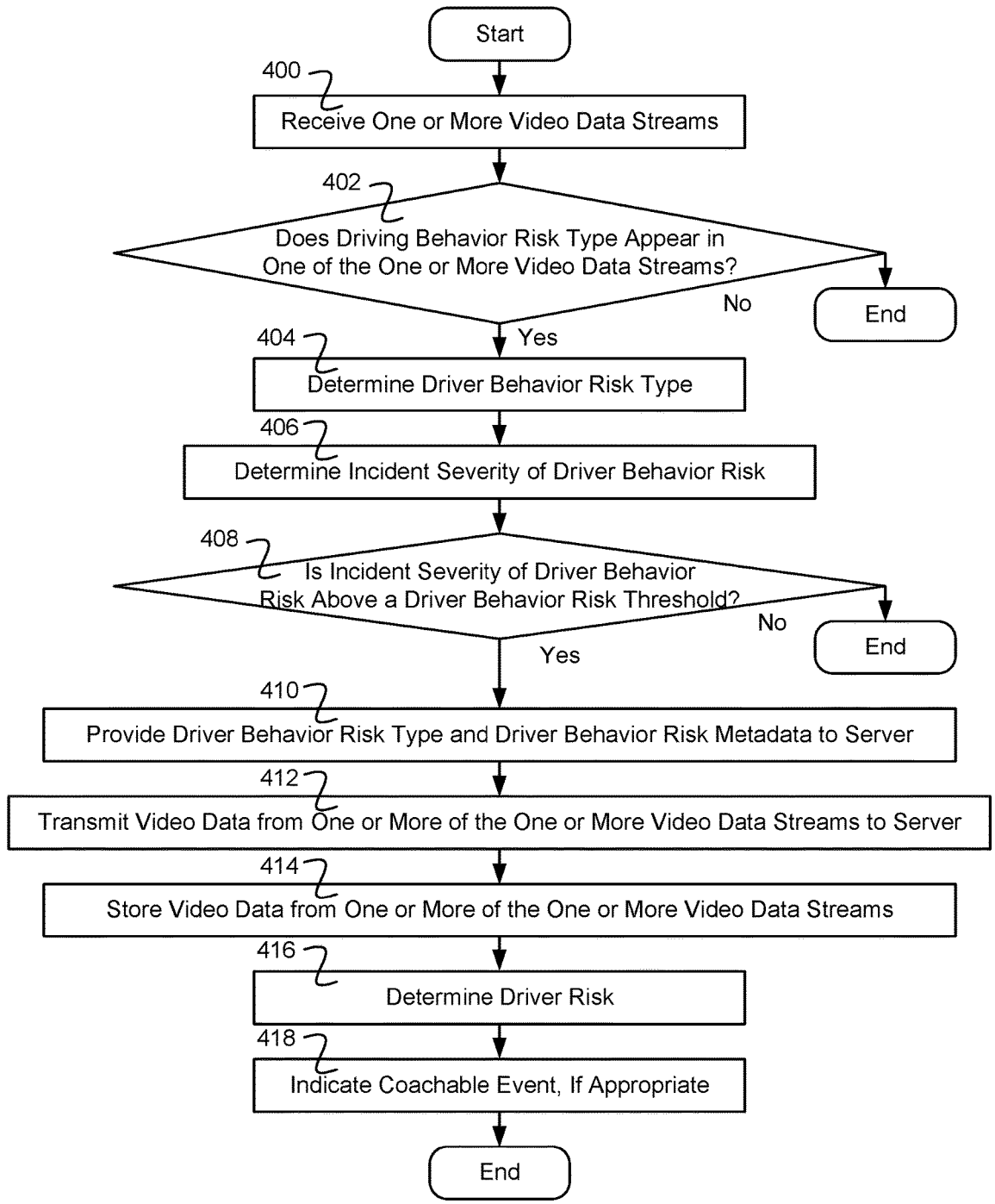
FIG. 4 is a flow diagram illustrating an embodiment of a process for driver risk determination using machine vision.

FIG. 4 is a flow diagram illustrating an embodiment of a process for driver risk determination using machine vision. In some embodiments, the process of FIG. 4 is executed by vehicle event recorder 102 of FIG. 1. In the example shown, in 400, one or more video data streams are received. In some embodiments, the one or more video data streams are received via an interface (e.g., a sensor interface). In 402, it is determined whether a driving behavior risk type appears in one of the one or more video data streams. In some embodiments, it is determined whether a driving behavior risk type appears in one of the one or more video data streams using machine vision. In some embodiments, a determination of the video stream comprising the driver risk type is indicated. In some embodiments, a determination of the video stream comprising the driver risk type is provided. In the event it is determined that a driving behavior risk type does not appear in one of the one or more video data streams, the process ends. In the event it is determined that a driving behavior risk type appears in one of the one or more video data streams, control passes to 404. In 404, the driver behavior risk type is determined. In 406, an incident severity of driver behavior risk is determined based at least in part on the driver behavior risk type. In some embodiments, the incident severity of a driver behavior risk type is determined based at least in part on a fraction of time the behavior was sustained. In some embodiments, the incident severity of driver behavior risk is determined based at least in part on how many driver behavior risk types co-occur in the incident. In 408, it is determined whether the incident severity of driver behavior risk is above a driver behavior risk video threshold. In the event it is determined that the incident severity of driver behavior risk is not above a driver behavior risk video threshold, the process ends. In the event it is determined that the incident severity of driver behavior risk is above a driver behavior risk video threshold, control passes to 410. In 410, the driver behavior risk type and driver behavior risk metadata is provided (e.g., to a server—for example, vehicle data server 104 of FIG. 1). In 412, video data from one or more of the one or more video data streams is transmitted to the server. In 414, video data from one or more of the one or more video data streams is stored. In 416, driver risk is determined. In 418, a coachable event is indicated, if appropriate. In various embodiments, one or more of 412, 414, 416 and 418 are not executed.

Figure 5A:
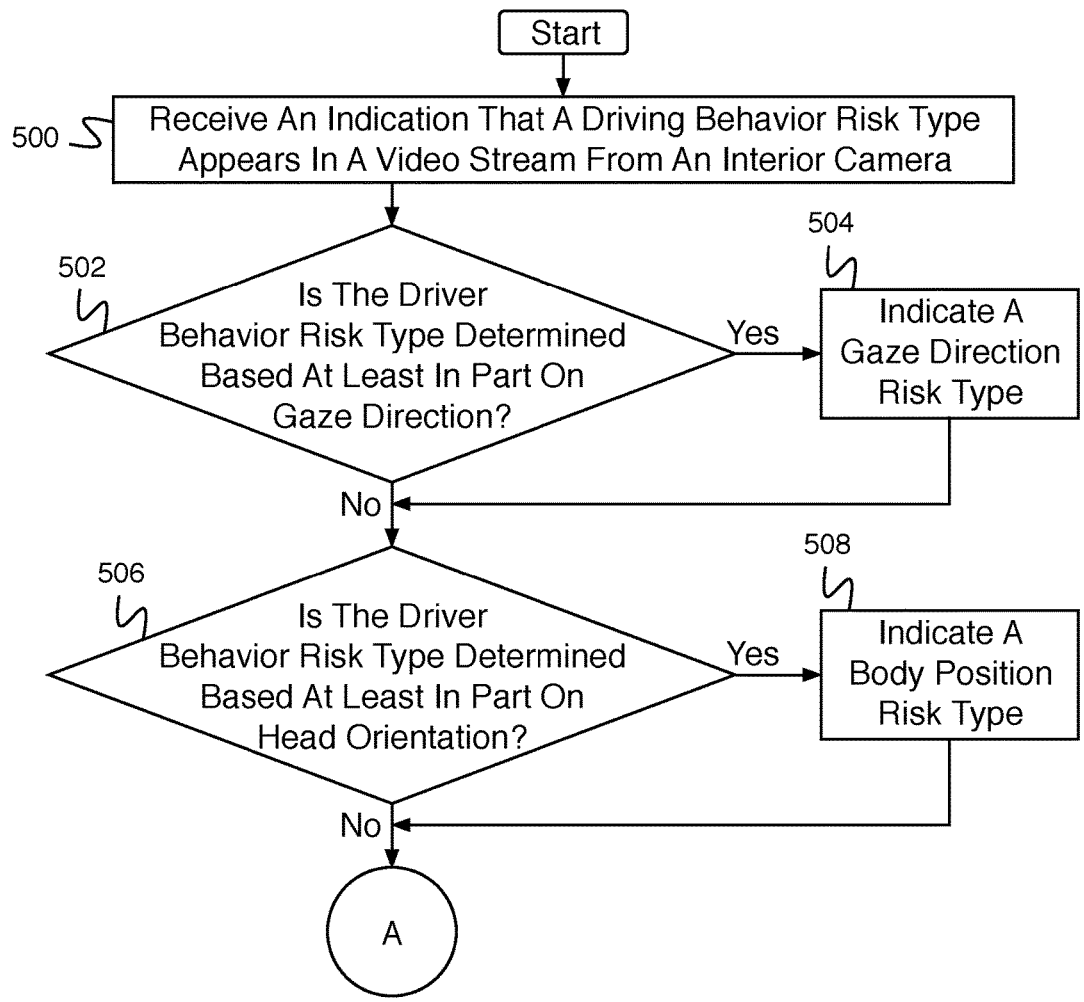
FIG. 5A is a flow diagram illustrating an embodiment of a first part of a process for determining a driver behavior risk type.

FIG. 5A is a flow diagram illustrating an embodiment of a first part of a process for determining a driver behavior risk type. In some embodiments, the processes of FIG. 5A and FIG. 5B together implement 404 of FIG. 4. In some embodiments, the processes of FIG. 5A and FIG. 5B together implement 404 of FIG. 4 in the event that a driving behavior risk type appears in a video stream from an interior camera. In the example shown, in 500, an indication is received that a driving behavior risk type appears in a video stream from an interior camera. In 502, it is determined whether the driver behavior risk type is determined based at least in part on a gaze direction. In some embodiments, a driver risk type is determined based at least in part on a gaze direction in the event a gaze direction comprises a gaze not directed at the road. In the event it is determined in 502 that a driver behavior risk type is not determined based at least in part on a gaze direction, control passes to 506. In the event it is determined in 502 that a driver behavior risk type is determined based at least in part on a gaze direction, control passes to 504. In 504, a gaze direction risk type is indicated. In some embodiments, a gaze direction risk type indicates that the driver is not looking at the road. Control then passes to 506. In 506, it is determined whether the driver behavior risk type is determined based at least in part on a head orientation. In some embodiments, a driver risk type is determined based at least in part on a head orientation in the event a head orientation indicates driver is not looking at the road (e.g., the driver is looking at a cell phone, at the floor, at a dashboard display, at a radio display, at the side of the road, at the sky, etc.). In the event it is determined in 506 that a driver behavior risk type is not determined based at least in part on a head orientation, control passes to A. In the event it is determined in 506 that a driver behavior risk type is determined based at least in part on a head orientation, control passes to 508. In 508, a head orientation risk type is indicated. In some embodiments, a head orientation risk type indicates that the driver is not looking at the road. Control then passes to A. In some embodiments, FIG. 5B continues the process from A.

Figure 5B:
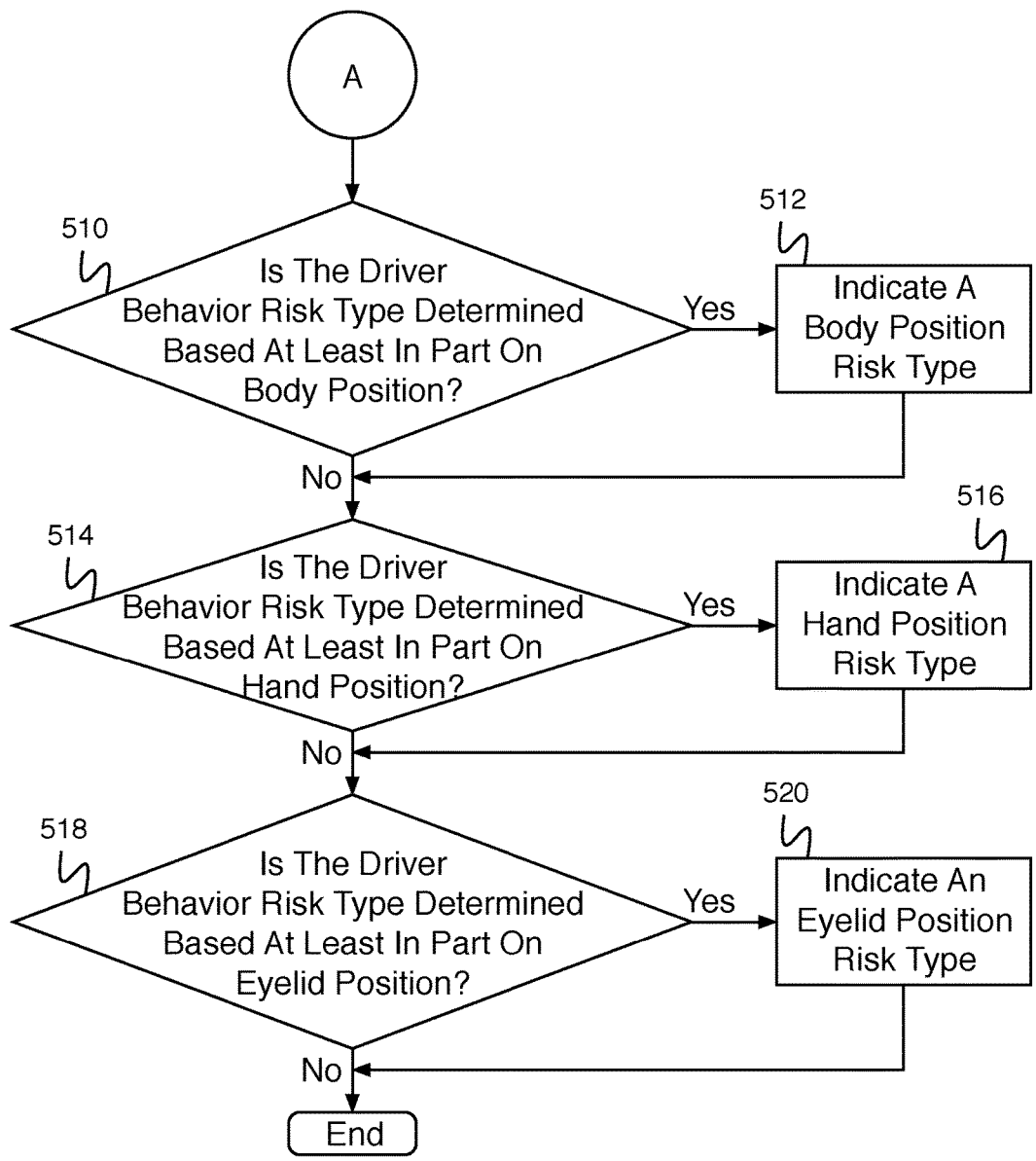
FIG. 5B is a flow diagram illustrating an embodiment of a second part of a process for determining a driver behavior risk type.

FIG. 5B is a flow diagram illustrating an embodiment of a second part of a process for determining a driver behavior risk type. In some embodiments, the processes of FIG. 5A and FIG. 5B together implement 404 of FIG. 4. In some embodiments, the processes of FIG. 5A and FIG. 5B together implement 404 of FIG. 4 in the event that a driving behavior risk type appears in a video stream from an interior camera. In the example shown, control passes from A to 510. In some embodiments, control initiating at A comprises the process continuing from the process of FIG. 5A. In 510, it is determined whether the driver behavior risk type is determined based at least in part on a body position. In the event it is determined in 510 that a driver behavior risk type is not determined based at least in part on a body position, control passes to 514. In the event it is determined in 510 that a driver behavior risk type is determined based at least in part on a body position, control passes to 512. In 512, a body position risk type is indicated. In some embodiments, a body position risk type indicates that the driver's body is not in the correct position for driving. Control then passes to 514. In 514, it is determined whether the driver behavior risk type is determined based at least in part on a hand position. In the event it is determined in 514 that a driver behavior risk type is not determined based at least in part on a hand position, control passes to 518. In the event it is determined in 514 that a driver behavior risk type is determined based at least in part on a hand position, control passes to 516. In some embodiments, a hand position risk type indicates that the driver's hands are not in the correct position for driving. In some embodiments, a driver risk type is determined based at least in part on a hand position in the event a hand position comprises a hand position holding a phone. In some embodiments, a driver risk type is determined based at least in part on a hand position in the event a hand position comprises a hand position eating. In some embodiments, a driver risk type is determined based at least in part on a hand position in the event a hand position comprises a hand position not holding the steering wheel. In 516, a hand position risk type is indicated. Control then passes to 518. In 518 it is determined whether the driver behavior risk type is determined based at least in part on an eyelid position. In the event it is determined in 518 that a driver behavior risk type is not determined based at least in part on an eyelid position, the process ends. In the event it is determined in 518 that a driver behavior risk type is determined based at least in part on an eyelid position, control passes to 520. In 520, an eyelid position risk type is indicated, and the process ends. In some embodiments, an eyelid position risk type indicates that the driver's eyes are closed.

Figure 6A:
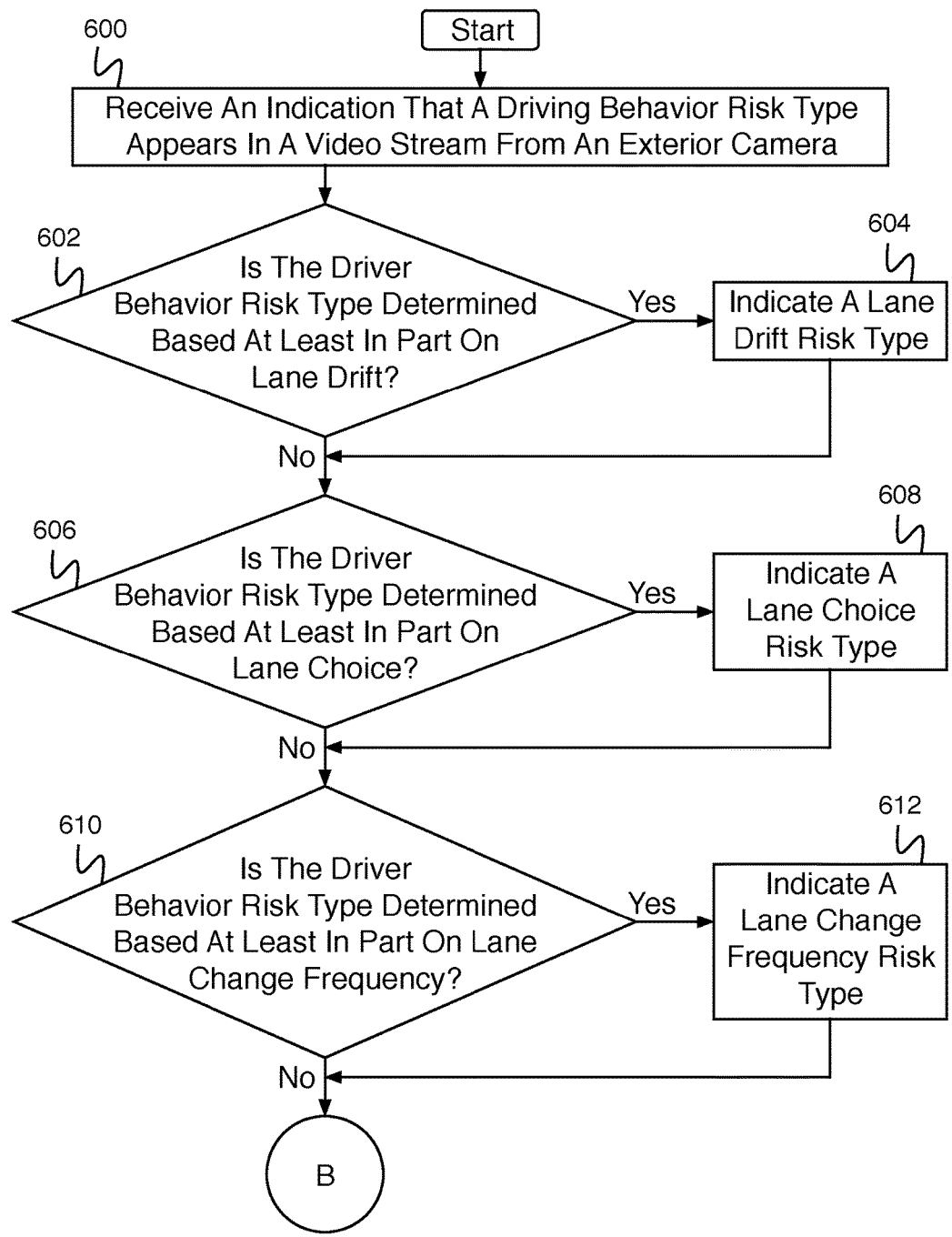
FIG. 6A is a flow diagram illustrating an embodiment of a first part of a process for determining a driver behavior risk type.

FIG. 6A is a flow diagram illustrating an embodiment of a first part of a process for determining a driver behavior risk type. In some embodiments, the processes of FIG. 6A and FIG. 6B together implement 404 of FIG. 4. In some embodiments, the processes of FIG. 6A and FIG. 6B together implement 404 of FIG. 4 in the event that a driving behavior risk type appears in a video stream from an exterior camera. In the example shown, in 600, an indication is received that a driving behavior risk type appears in a video stream from an exterior camera. In 602, it is determined whether the driver behavior risk type is determined based at least in part on lane drift. In the event it is determined in 602 that a driver behavior risk type is not determined based at least in part on lane drift, control passes to 606. In the event it is determined in 602 that a driver behavior risk type is determined based at least in part on lane drift, control passes to 604. In 604, a lane drift risk type is indicated. In some embodiments, a lane drift risk type indicates that the vehicle position in the lane is not correct. Control then passes to 606. In 606, it is determined whether the driver behavior risk type is determined based at least in part on lane choice. In the event it is determined in 606 that a driver behavior risk type is not determined based at least in part on lane choice, control passes to 610. In the event it is determined in 606 that a driver behavior risk type is determined based at least in part on lane choice, control passes to 608. In 608, a lane choice risk type is indicated. In some embodiments, a lane choice risk type indicates that the vehicle is in the incorrect lane (e.g., a big rig in the leftmost lane). Control then passes to 610. In 610, it is determined whether the driver behavior risk type is determined based at least in part on lane change frequency. In some embodiments, frequent lane change is determined from analysis of video from an exterior camera. In the event it is determined in 610 that a driver behavior risk type is not determined based at least in part on lane change frequency, control passes to B. In the event it is determined in 610 that a driver behavior risk type is determined based at least in part on lane change frequency, control passes to 612. In 612, a lane change frequency risk type is indicated. In some embodiments, a lane change frequency risk type indicates that the vehicle is driving too aggressively (e.g., by changing lanes very frequently—for example, a number of lane changes in a recent time period (e.g., 3 lane changes in the last 2 minutes)). Control then passes to B. In some embodiments, FIG. 6B continues the process from B.

Figure 6B:
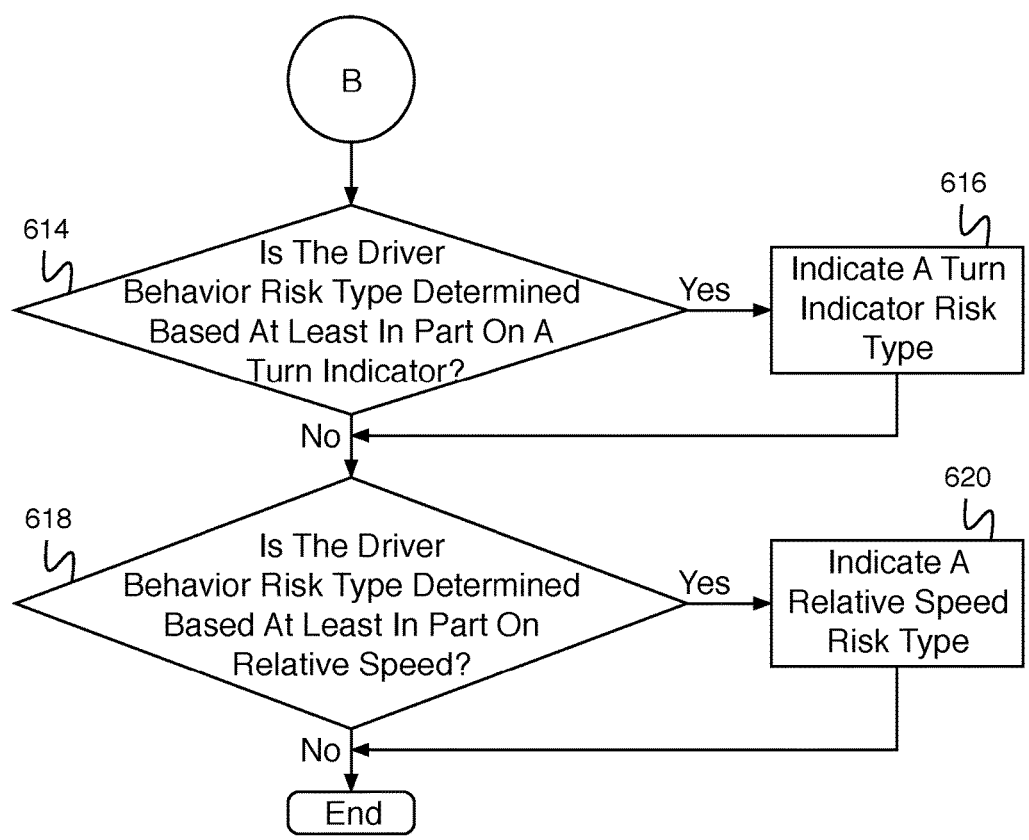
FIG. 6B is a flow diagram illustrating an embodiment of a second part of a process for determining a driver behavior risk type.

FIG. 6B is a flow diagram illustrating an embodiment of a second part of a process for determining a driver behavior risk type. In some embodiments, the processes of FIG. 6A and FIG. 6B together implement 404 of FIG. 4. In some embodiments, the processes of FIG. 6A and FIG. 6B together implement 404 of FIG. 4 in the event that a driving behavior risk type appears in a video stream from an exterior camera. In the example shown, control passes from B to 614. In some embodiments, control initiating at B comprises the process continuing from the process of FIG. 6A. In 614, it is determined whether the driver behavior risk type is determined based at least in part on a turn indicator. In the event it is determined in 614 that a driver behavior risk type is not determined based at least in part on a turn indicator, control passes to 618. In the event it is determined in 614 that a driver behavior risk type is determined based at least in part on a turn indicator, control passes to 616. In 616, a turn indicator risk type is indicated. In some embodiments, a turn indicator risk type indicates that a lane change was made without indicating using the turn indicator. Control then passes to 618. In 618, it is determined whether the driver behavior risk type is determined based at least in part on relative speed. In the event it is determined in 618 that a driver behavior risk type is not determined based at least in part on relative speed, the process ends. In the event it is determined in 618 that a driver behavior risk type is determined based at least in part on relative speed, control passes to 620. In 620, a relative speed risk type is indicated. In some embodiments, a relative speed risk type indicates that the vehicle is traveling the incorrect speed relative to the other vehicles on the road (e.g., 15 miles per hour faster than the average speed of the road).

Figure 7:
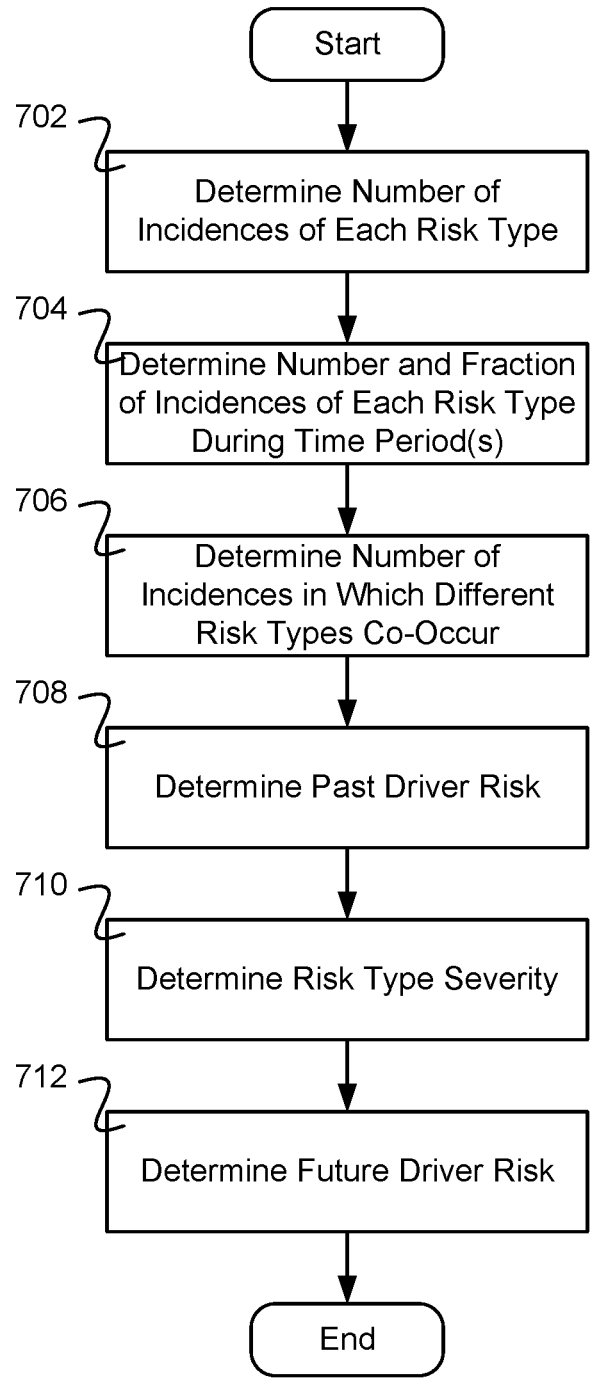
FIG. 7 is a flow diagram illustrating an embodiment of a process for determining a driver risk based at least in part on a driver behavior risk type.

FIG. 7 is a flow diagram illustrating an embodiment of a process for determining a driver risk based at least in part on a driver behavior risk type. In some embodiments, the process of FIG. 7 implements 416 of FIG. 4. In some embodiments, the process of FIG. 7 is implemented on a vehicle data server (e.g., vehicle data server 104 of FIG. 1) that aggregates current and historical data from a plurality of event recorders. In some embodiments, the process of FIG. 7 includes the result of human review of video events indicating which risky behaviors were observed during the event. In some embodiments, the severity of the observed risky behavior is determined by the correlation to the occurrence of a future collision. In the example shown, in 702, a number of incidences of each risk type is determined. In various embodiments, the incidences of each risk type include metadata events, video, or metadata events and video. In some embodiments, a number of incidences comprises a total number of metadata events and a total number of videos of each risk type. In some embodiments, a number of incidences comprises a total number of videos that were observed to contain a risky behavior (e.g., driver had eyes off the road while he was operating a handheld cellphone, driver unintentionally drifted from his lane while eating food, etc.). In some embodiments, a metadata event comprises data summarizing sensor measurements during a risk incident; for example, it includes a timestamp, an incident risk type, and a list of sensor measurements. In some embodiments, a number of incidences comprises a number of recent metadata events and a number of recent videos (e.g., a number of incidences in the last week, in the last month, in the last year, etc.). In 704, a number and fraction of incidences of each risk type during time period(s) is determined. In some embodiments, a combined number of metadata incidences from different risk types is determined in a very recent time period (e.g., a recent window of 2 seconds, 5 seconds, 1 minute, 5 minutes, etc.) and correlated with risky behaviors observed in a co-occurring video event (e.g., when 10 or more metadata events of lane departure risk type are observed in the last 5 minutes there is a 75% chance that the driver was distracted operating an electronic device or eating food). In some embodiments, the number of incidences of each risk type over different time periods are compared to estimate changes in driver risk (e.g., estimate the number of incidences of multiple lane change risk type observed during the last 1 week and the last 4 weeks, if the number of incidences during the last 1 week are larger than one quarter the number of incidences in the last 4 weeks that means the driver has gotten riskier during the last 1 week). In 706, a number of incidences in which different risk types co-occur is determined. In 708, a past driver risk is determined. In some embodiments, a past driver risk is determined by analyzing video data stream data. In some embodiments, a past driver risk is determined by analyzing other data (e.g., sensor data, audio data, etc.). In some embodiment, past driver risk is determined by analyzing the behaviors observed during a human review of the video incidents that were transmitted. In some embodiments, past driver risk is determined by analyzing metadata incidents and estimating their risk from the behaviors observed in co-occurring videos in situations where metadata and videos were available. In some embodiments, a past driver risk is not determined for a risk type but from a number of occurrences of such a risk type (e.g., an incident has a binary severity, either occurring or not, in these cases the severity is measured by the number of times that risk type has been observed). In 710, a risk type severity is determined (e.g., how severe the current risk type is). For example, a lane drift risk type could be determined to be more severe than a lane choice risk type. In 712, a future driver risk is determined. In various embodiments, a future driver risk is determined by based at least in part on one or more of the number of incidences of the current risk type, the combined number of incidences, the fraction of time of incidence of the current risk type, the combined fraction of time of incidences, the past driver risk, the risk type severity, the comparison of the driver risk at different fractions of time, or any other appropriate factors. In various embodiments, the future driver risk is determined using a linear combination of factors, a nonlinear combination of factors, a neural network, a machine learning model, or using any other appropriate technique.

In some embodiments, for each risk type, statistics on the number and quality of the metadata are gathered, and the number of videos and behaviors observed are used to determine driver performance and future risk of collision.

In some embodiments, an example is as follows:
risk type—gaze direction
risk measure—driver kept his eyes off the road for a number of seconds (e.g., 2 seconds) while driving above a minimum speed (e.g., 10 kilometers per hour)
metadata threshold—threshold number of seconds of looking off the road (e.g., 2 consecutive seconds)
video threshold—a number of consecutive seconds (e.g., 3 seconds) looking off-road or a total number of seconds looking off-road accumulated during a time period (e.g., 5 total seconds in the last 10 seconds)

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for driver risk determination using machine vision, comprising:
   an interface to receive one or more video data streams of a vehicle, wherein the one or more video data streams comprise one or more of a video stream from an interior camera of the vehicle and a video stream from an exterior camera of the vehicle;
one or more processors to:
determine, using machine vision, whether a driving behavior risk type appears in one of the one or more video data streams;
in response to the driving behavior risk type appearing in the one of the one or more video data streams:
indicate an incidence of a driver behavior risk type;
determine a change in a driver risk based at least on a comparison of a number of incidences of driver risk types over a first period of time and a number of incidences of driver risk types over a second period of time, wherein the number of incidences of driver risk types over the second period of time includes the incidence of the driver behavior risk type, wherein the first period of time consists of N units of time, wherein the second period of time consists of a most recent 1/N units of time, and wherein the first period of time includes the second period of time; and
determine that the change in driver risk comprises an increase in risk when the number of incidences of driver risk types over the second period of time exceeds the number of incidences of driver risk types over the first period of time divided by N.

2. The system of claim 1, wherein the processor is further to:
determine an incident severity of driver behavior risk based at least in part on the driver behavior risk type.

3. The system of claim 2, wherein the incident severity of driver behavior risk is determined based at least in part on a fraction of time the behavior was sustained.

4. The system of claim 2, wherein the incident severity of driver behavior risk is determined based at least in part on how many driver behavior risk types co-occur in the incident.

5. The system of claim 2, wherein one processor of the one or more processors is further to:
in response to the incident severity of driver behavior risk being above a driver behavior risk threshold, provide the driver behavior risk type to a server.

6. The system of claim 2, wherein one processor of the one or more processors is further to:
in response to the incident severity of driver behavior risk being above a driver behavior risk threshold, store video data from the one of the one or more video data streams.

7. The system of claim 2, wherein one processor of the one or more processors is further to:
in response to the incident severity of driver behavior risk being above a driver behavior risk threshold, provide driver behavior risk metadata and the one of the one or more video data streams to a server.

8. The system of claim 7, wherein the server is used to determine a past or a future driver risk based at least in part on the driver behavior risk metadata or the one of the one or more video data streams.

9. The system of claim 8, wherein the past or the future driver risk is based at least in part on a behavior observed during a human review of the one of the one or more video data streams.

10. The system of claim 8, wherein the past or the future driver risk is determined based at least in part on a number of driver behavior events of the driver behavior risk type.

11. The system of claim 8, wherein the past or the future driver risk is determined based at least in part on a number of driver behavior events of a plurality of driver behavior risk types.

12. The system of claim 8, wherein the past or the future driver risk is based at least in part on a number of driver behavior events of the driver behavior risk type occurring during a recent period of time.

13. The system of claim 8, wherein the past or the future driver risk is based at least in part on a number of driver behavior events of a plurality of driver behavior risk types occurring during recent periods of time.

14. The system of claim 8, wherein the past or the future driver risk is based at least in part on a severity of a determined driving behavior risk incidence.

15. The system of claim 8, wherein the past or the future driver risk is based at least in part on a severity of a determined driving behavior risk type.

16. The system of claim 1, wherein one processor of the one or more processors is further to:
in response to a driver risk being above a threshold, indicate a coachable event.

17. The system of claim 1, wherein the one of the one or more video data streams comprises the interior camera and the driver behavior risk type is determined based at least in part on a gaze direction.

18. The system of claim 17, wherein the gaze direction comprises a gaze not directed at the road ahead.

19. The system of claim 1, wherein the one of the one or more video data streams comprises the interior camera and the driver behavior risk type is determined based at least in part on a head orientation.

20. The system of claim 19, wherein the head orientation comprises a direction not pointing at the road ahead.

21. The system of claim 1, wherein the one of the one or more video data streams comprises the interior camera and the driver behavior risk type is determined based at least in part on a body position.

22. The system of claim 1, wherein the one of the one or more video data streams comprises the interior camera and the driver behavior risk type is determined based at least in part on a hand position.

23. The system of claim 22, wherein the hand position comprises a hand position holding a phone.

24. The system of claim 22, wherein the hand position comprises a hand position during eating.

25. The system of claim 1, wherein the one of the one or more video data streams comprises the interior camera and the driver behavior risk type is determined based at least in part on an eyelid position.

26. The system of claim 25, wherein the eyelid position comprises an eyelid position of closed eyes.

27. The system of claim 1, wherein the one of the one or more video data streams comprises the exterior camera and the driver behavior risk type is determined based at least in part on a lane drift.

28. The system of claim 1, wherein the one of the one or more video data streams comprises the exterior camera and the driver behavior risk type is determined based at least in part on a lane choice.

29. The system of claim 1, wherein the one of the one or more video data streams comprises the exterior camera and the driver behavior risk type is determined based at least in part on a turn indicator of the vehicle.

30. The system of claim 1, wherein the one of the one or more video data streams comprises the exterior camera and the driver behavior risk type is determined based at least in part on a speed relative to a traffic speed.

31. The system of claim 1, wherein the one of the one or more video data streams comprises the exterior camera and the driver behavior risk type is determined based at least in part on a lane change frequency.

32. The system of claim 1, wherein the one or more video data streams comprises one or more of the following: a video stream from a vehicle camera, or a video stream from the interior camera and a video stream from the exterior camera.

33. A method for driver risk determination using machine vision, comprising:
receiving one or more video data streams of a vehicle, the one or more video data streams comprising one or more of a video stream from an interior camera of the vehicle and a video stream from an exterior camera of the vehicle;
determining, using one or more processors, whether a driving behavior risk type appears in one of the one or more video data streams; and
in response to a driving behavior risk type appearing in the one of the one or more video data streams:
indicating an incidence of a driver behavior risk type;
determining a change in a driver risk based at least on a comparison of a number of incidences of driver risk types over a first period of time and a number of incidences of driver risk types over a second period of time, wherein the number of incidences of driver risk types over the second period of time includes the indicated incidence of the driver behavior risk type, wherein the first period of time consists of N units of time, wherein the second period of time consists of a most recent 1/N units of time, and wherein the first period of time includes the second period of time; and
determining that the change in driver risk comprises an increase in risk when the number of incidences of driver risk types over the second period of time exceeds the number of incidences of driver risk types over the first period of time divided by N.

34. A computer program product for driver risk determination using machine vision, the computer program product being embodied in a non-transitory computer readable storage medium and comprising computer instructions for:
receiving one or more video data streams of a vehicle, the one or more video data streams comprising one or more of a video stream from an interior camera of the vehicle and a video stream from an exterior camera of the vehicle;
determining, using machine vision, whether a driving behavior risk type appears in one of the one or more video data streams; and
in response to a driving behavior risk type appearing in the one of the one or more video data streams:
indicating an incidence of a driver behavior risk type;
determining a change in a driver risk based at least on a comparison of a number of incidences of driver risk types over a first period of time and a number of incidences of driver risk types over a second period of time, wherein the number of incidences of driver risk types over the second period of time includes the indicated incidence of the driver behavior risk type, wherein the first period of time consists of N units of time, wherein the second period of time consists of a most recent 1/N units of time, and wherein the first period of time includes the second period of time; and
determining that the change in driver risk comprises an increase in risk when the number of incidences of driver risk types over the second period of time exceeds the number of incidences of driver risk types over the first period of time divided by N.

35. The system of claim 1, wherein the interface comprises an on-board diagnostics (OBD) bus.

* * * * *